Patented July 13, 1937

2,087,190

UNITED STATES PATENT OFFICE 2,087,190

PRINTING INK

Albert E. Gessler, Ardsley-on-Hudson, N. Y., assignor, by mesne assignments, to The International Printing Ink Corporation, New York, N. Y., a corporation of Ohio No Drawing. Application July 14, 1932, Serial No. 622,453. Renewed April 11, 1936

15 Claims. (Cl. 134—36)

The present invention relates to printing inks and has for an object the preparation of a novel type of printing ink, which possesses many advantages over the printing inks heretofore known and overcomes many of the disadvantages associated with the procedure which it has been necessary to use in order that such inks may be properly applied to produce a satisfactory print.

Heretofore, printing inks have in general been made by grinding pigments in oils or oil-varnishes, or both. Such oils or varnishes have absolute viscosities of 5 poises or above at 25° C., measured by the method applied to varnish viscosities (Gardner's Physical and Chemical Examination of Paints, Varnishes, etc., fifth edition 1930, pp. 246, 152, 153) and have been characterized by their relatively slow rate of drying depending upon polymerization, oxidation and/or absorption and, as a consequence, have presented great difficulty in printing processes by greatly delaying the speed of operation. This has not only necessitated the expense and maintenance of large and cumbersome auxiliary equipment and extra labor, but has also resulted in a dependency of the printing process upon the time required to obtain a complete drying.

In order to overcome these difficulties, it has been customary to incorporate in the inks varying amounts of driers which have the ability to accelerate the speed of the oxidation and/or polymerization of the oil varnishes. However, even with all possible acceleration, the drying of the prints takes many hours or even days, necessitating in addition to the great delay in time, extra labor to remove, to store, and to return to the machines the printed material and also in many cases a great waste of paper in the form of slip-sheets which must be rolled up or stacked between the prints in order to avoid offsetting, rubbing off, smudging or sticking together.

It has also been proposed to use various types of lacquers in printing processes, particularly cellulose lacquers. As is well known, the cellulose solvents used in these lacquers are characterized by a high degree of volatility. Indeed, this characteristic is considered an advantage in lacquers, for in the ordinary use to which lacquers are put, a rapid drying or hardening is highly desirable. However, it is obvious that such rapid drying renders inks made on this principle unsuitable for printing from plates or rollers; for, while they may be applied to printing plates or rollers, they will quickly dry and harden thereon and they will have only the effect of yielding dry or half dry material to the printing form from which, therefore, no satisfactory impression can be made on the material to be printed.

I have discovered, however, that if in contrast to the above, cellulose compounds, particularly nitrocellulose, are dissolved in solvents with high boiling points, this difficulty may be avoided. Naturally, if the solvents are too slow in evaporating, the same difficulties, which occur in the case of ordinary oil varnish inks, are encountered. In this respect I have found that certain such high boiling solvents, very well adapted to dissolve cellulose compounds, have at room temperature such slow drying properties that, while they may be employed as solvents in this ink, and while an excellent impression may be transferred to the surface to be printed upon, the impression will nevertheless be so moist that it is likely to become blurred or smudged by rubbing after many hours or even days. This defect, however, may be remedied by the present invention, which involves a recognition of the principle that some of these high boiling solvents exhibit, at temperatures elevated above room temperatures, such a remarkable and quick increase in their vapor pressure that they volatilize rapidly, while at the same temperatures others show little change in their vapor pressures and therefore are practically non-volatile.

By room temperatures, I mean the ordinary temperatures of a room in which technical work is carried on, which is generally accepted to be 20° to 25° C.

As above indicated, the present invention makes use of the characteristics of these solvents having high boiling points and high vapor pressures at elevated temperatures.

The referred to solutions, in contradistinction to lacquer solutions which require highly volatile solvents, are characterized by their very low rate of evaporation at temperatures approximating room temperature and by their ability to manifest a relatively high degree of volatility when subjected to temperatures higher than room temperature. The solvents or solvent mixtures utilized in the formation of these solutions may be described as solvents having a high boiling point combined with a low vapor pressure at room temperature, but yet further characterized by a rapid rise in their vapor pressure curves upon elevation of the temperature,—that is, by their property of evaporating quickly from a thin layer, as in a print, when the temperature is sufficiently raised. Among this peculiar class of solvents I have found as an example diethylene glycol monobutyl ether to be a solvent for nitrocellulose and many natural and artificial gums, very well adapted to the purposes of this invention. This solvent at room temperatures remains fluid and moist for a long period of time. When heated to about 100° C. or above, the rate of vaporization is greatly accelerated and, when used in the ink of this invention, produces a print which dries almost instantaneously when subjected to such a heat treatment.

The printing ink above briefly described may be further admixed with varying amounts of another and different class of oils or high boiling solvents possessing a very low vapor pressure over a wide range of temperatures, and characterized in that they are practically non-volatile if exposed to the heat necessary for the process. This admixture acts as a plasticizer and tends to prevent the brittle characteristic of a film consisting of nitrocellulose or gums alone.

The following specific example is illustrative of my invention as applied to the production of a yellow printing ink particularly. The ink may be made up as follows: 100 parts of chrome yellow, 35 parts of nitrocellulose (low viscosity), 55 parts of diethylene glycol monobutyl ether, 10 parts of dibutylphthalate, and 10 parts of blown castor oil.

The above composition may, for example, be prepared by grinding or otherwise dispersing the pigment in a solution of the nitrocellulose in diethylene glycol monobutyl ether. The two other ingredients may be introduced in such order as may be expedient. It will, of course, be recognized that the yellow pigment may be replaced by any suitable pigments or dyestuffs and/or mixtures thereof; that the nitrocellulose may be replaced by other cellulose compounds and/or by natural or synthetic resins. Moreover, the dibutylphthalate may be replaced by any other suitable agent, effective to prevent brittleness in the finished product. Also, the blown castor oil which has been included in the specific formula given may be replaced by other suitable materials. It may be desirable in some circumstances to omit the last two types of ingredients referred to in the illustrative formula, namely, those which have been added in order to offset extreme hardness and brittleness.

Diethylene glycol monobutyl ether is a practically odorless, saturated, aliphatic or open-chain chemical compound of carbon, hydrogen and oxygen.

The diethylene glycol monobutyl ether may be replaced by other solvents or solvent mixtures possessing a similar low rate of evaporation at ordinary temperatures and a marked acceleration of volatility at raised temperatures. These important properties of diethylene glycol monobutyl ether, the preponderant solvent constituting the major part of the liquid component of the ink in the example given, may, for comparative purposes, be indicated numerically in terms of its vapor pressure at different temperatures which, as determined by Brewer and Gardner in "Industrial and Engineering Chemistry", vol. 29, No. 2, p. 179, February, 1937, are as follows:

|  | Mm. of mercury |
|---|---|
| At 20° C. | 0.02 |
| At 100° C. | 6.4 |
| At 150° C. | about 60.0 |

These vapor pressures indicate that, at elevated temperatures, this solvent becomes a highly volatile liquid like such highly volatile liquids as, for example, ethyl alcohol which has a vapor pressure of about 40 mm. at ordinary room temperature. The vapor pressures of my preponderant solvent at elevated temperatures contrast sharply with those of the high boiling solvents ordinarily termed "plasticizers" such as dibutyl phthalate, a minor proportion of which is used in the specific formula given. The vapor pressure of this liquid, according to Brewer and Gardner, is 0.45 mm. at 100° C. and 1.4 mm. at 150° C. The vapor pressures of diethylene glycol monobutyl ether indicate that this solvent will evaporate almost instantaneously at elevated temperatures like ethyl alcohol at ordinary temperatures, while such high boiling solvents or plasticizers as dibutyl phthalate evaporate only slowly when heated to temperatures of 100° C. or 150° C.

With ink prepared as above, the printing operation may be carried out in the ordinary manner and at ordinary temperatures. At the conclusion of the printing operation, the printed materials may be subjected, in known manner, to sufficient heat to dry the thin film of the print very rapidly. Thus a finished print is obtained immediately at the end of the printing and heating operation and no time, labor, nor material is wasted in delays incident to the prolonged drying of the printed goods under the processes at present in use. This method of printing is not claimed herein as it forms the subject matter of my co-pending application, Serial No. 15,944, filed April 12, 1935, which is in part a continuation of this application.

The novel ink and process described above are not only capable of utilization in printing upon paper, but they are also adapted for use in making very satisfactory prints upon many other surfaces, such as for instance textiles or metallic surfaces, or the lacquered surfaces of Cellophane, or the like, where the production of a satisfactory print has heretofore been much restricted.

It is apparent that such an ink as has been described does not necessitate the admixture of driers, does not set or harden on the printing rollers or plates, but is yet capable of being dried very quickly when subjected to suitable temperatures after being printed, by the evaporation of the solvent from the thin layer of the print. The finished products are flexible prints in which the pigment is well protected against being rubbed off. They are not softened by moisture, grease, or chemical influences and possess practically no odor. The ink adheres securely to almost every type of surface.

What I claim is:

1. A printing ink which is substantially non-drying at ordinary temperatures and dries instantly on heating of the printed matter, consisting of coloring matter dispersed in an organic viscous vehicle consisting of a liquid component and a solid component dissolved in the liquid component in sufficient quantity to give the ink the consistency of an ordinary oil-varnish printing ink—the solid component being a member of the group consisting of natural and synthetic resins and cellulose compounds, and the major part of the liquid component being a chemical compound containing carbon, hydrogen and oxygen which dissolves and forms a stable solution with the solid component and which has a vapor pressure which, at 20° C., is as low as the vapor pressure of diethylene glycol monobutyl ether at 20° C., and, at 150° C., approximates that of ethyl alcohol at ordinary temperatures.

2. A printing ink which is substantially non-drying at ordinary temperatures and dries instantly on heating of the printed matter, consisting of coloring matter dispersed in an organic viscous vehicle consisting of a liquid component and a solid component dissolved in the liquid component in sufficient quantity to give the ink the consistency of an ordinary oil-varnish printing ink—the solid component being a member of the group consisting of natural and synthetic resins and cellulose compounds, and substantially 73% of the liquid component being a chemical compound containing carbon, hydrogen and oxygen, which dissolves and forms a stable solution with the solid component and which has a vapor pressure which, at 20° C., is as low as the vapor pressure of diethylene glycol monobutyl ether at 20° C., and, at 150° C., approximates that of ethyl alcohol at ordinary temperatures.

3. A printing ink which is substantially non-drying at ordinary temperatures and dries instantly on heating of the printed matter, consisting of coloring matter dispersed in an organic viscous vehicle consisting of a liquid component and a solid component completely dissolved in the liquid component in sufficient quantity to give the ink the consistency of an ordinary oil-varnish printing ink—the solid component being a member of the group consisting of natural and synthetic resins and cellulose compounds, substantially all of the liquid component having a vapor pressure at 20° C. as low as that of diethylene glycol monobutyl ether at 20° C., and the major part of the liquid component having a vapor pressure which at 150° C. approximates that of ethyl alcohol at ordinary temperatures and forming a stable solution with the solid component.

4. A printing ink which is substantially non-drying at ordinary temperatures and dries rapidly at 150° C., consisting of coloring matter dispersed in an organic viscous vehicle consisting of a liquid component and a solid component—being a member of the group consisting of natural and synthetic resins and cellulose compounds—dissolved in the liquid component in sufficient quantity to give the ink the consistency of an ordinary oil-varnish printing ink, in which the major part of the liquid component is an ether including one butyl radical and one diethylene glycol radical and having a vapor pressure which at 20° C. is as low as the vapor pressure of diethylene glycol monobutyl ether at 20° C., and at 150° C. approximates that of ethyl alcohol.

5. A printing ink which is substantially non-drying at ordinary temperatures and dries rapidly at 150° C., consisting of coloring matter dispersed in an organic viscous vehicle consisting of a liquid component and a solid component—being a member of the group consisting of natural and synthetic resins and cellulose compounds—dissolved in the liquid component in sufficient quantity to give the ink the consistency of an ordinary oil-varnish printing ink, in which the major part of the liquid component is mono-butyl ether of diethylene glycol.

6. A printing ink which is substantially non-drying at ordinary temperatures and which dries rapidly at 150° C. consisting of a coloring matter dispersed in a viscous fluid vehicle consisting of a liquid component the major portion of which is an organic solvent forming stable solutions with both nitrocellulose and resin having a vapor pressure which at 20° C. is as low as the vapor pressure of diethylene glycol monobutyl ether at 20° C., and at 150° C. approximates that of ethyl alcohol, and a solid component completely dissolved in the liquid component in an amount at least 47% of the amount of said liquid component, said solid component being a member of the group consisting of natural and synthetic resins and low viscosity cellulose esters.

7. A printing ink which is substantially non-drying at ordinary temperatures and which dries instantly on heating of the printed matter, consisting of coloring matter dispersed in an organic viscous vehicle consisting of a liquid component and a solid component dissolved in a liquid component in sufficient quantity to give the ink the consistency of an ordinary oil-varnish printing ink—the solid component being a cellulose compound, and the major part of the liquid component being a chemical compound which dissolves and forms a stable solution with the solid component and which has a vapor pressure which at 20° C. is as low as the vapor pressure of diethylene glycol monobutyl ether at 20° C., and at 150° C. approximates that of ethyl alcohol at ordinary temperatures.

8. A printing ink which is substantially non-drying at ordinary temperatures and dries instantly on heating of the printed matter, consisting of coloring matter dispersed in an organic viscous vehicle consisting of a liquid component and a solid component dissolved in the liquid component in sufficient quantity to give the ink the consistency of an ordinary oil-varnish printing ink—the solid component being a member of the group consisting of natural and synthetic resins and cellulose compounds, and the major part of the liquid component being an aliphatic chemical compound containing carbon, hydrogen and oxygen which dissolves and forms a stable solution with the solid component and which has a vapor pressure which, at 20° C., is as low as the vapor pressure of diethylene glycol mono-butyl ether at 20° C., and, at 150° C., approximates that of ethyl alcohol at ordinary temperatures.

9. A printing ink which is substantially non-drying at ordinary temperatures and dries instantly on heating of the printed matter, consisting of coloring matter dispersed in an organic viscous vehicle consisting of a liquid component and a solid component dissolved in the liquid component in sufficient quantity to give the ink the consistency of an ordinary oil-varnish printing ink—the solid component being a member of the group consisting of natural and synthetic resins and cellulose compounds, and the major part of the liquid component being a saturated chemical compound containing carbon, hydrogen and oxygen which dissolves and forms a stable solution with the solid component and which has a vapor pressure which, at 20° C., is as low as the vapor pressure of diethylene glycol mono-butyl ether at 20° C., and, at 150° C., approximates that of ethyl alcohol at ordinary temperatures.

10. A printing ink which is substantially non-drying at ordinary temperatures and dries instantly on heating of the printed matter, consisting of coloring matter dispersed in an organic viscous vehicle consisting of a liquid component and a solid component completely dissolved in the liquid component in sufficient quantity to give the ink the consistency of an ordinary oil-varnish printing ink—the solid component being a member of the group consisting of natural and synthetic resins and cellulose compounds, substantially all of the liquid component having a vapor pressure at 20° C. as low as the vapor pressure of diethylene glycol monobutyl ether at 20° C., and the major part of the liquid component having an open-chain structure and a vapor pressure which at 150° C. approximates that of ethyl alcohol at ordinary temperatures and forming a stable solution with the solid component.

11. A printing ink which is substantially non-drying at ordinary temperatures and dries instantly on heating of the printed matter, consisting of coloring matter dispersed in an organic viscous vehicle consisting of a liquid component and a solid component completely dissolved in the liquid component in sufficient quantity to give the ink the consistency of an ordinary oil-varnish printing ink—the solid component being a member of the group consisting of natural and synthetic resins and cellulose compounds, substantially all of the liquid component having a vapor pressure at 20° C. as low as the vapor pressure of diethylene glycol monobutyl ether at 20° C., and the major part of the liquid component having a vapor pressure which at 150° C. approximates that of ethyl alcohol at ordinary temperatures and being a saturated compound forming a stable solution with the solid component.

12. A printing ink adapted for use on paper, comprising a coloring material in a vehicle containing essentially a binder for the coloring material and a solvent for the binder, said binder forming a stable solution in said solvent and being present in amount sufficient to give the ink the consistency of ordinary oil-varnish printing inks, and to protect the coloring material against being rubbed off when the ink is applied by an ordinary printing press, and substantially all of said solvent having a vapor pressure at 20° C. as low as that of diethylene glycol monobutyl ether at 20° C., and developing such a marked increase in vapor pressure at elevated temperatures of 100° C. or above, to which printed paper can be subjected, that its vapor pressure at 150° C. approximates that of ethyl alcohol at ordinary temperatures and that it practically immediately evaporates from a thin film of ink at such temperatures, whereby said ink is stable on the printing press and capable of being immediately dried upon the application of heat following the printing operation.

13. A printing ink consisting of pigment dispersed in an organic viscous vehicle, consisting of a liquid component and a solid component—the solid component being a member of the group consisting of natural and synthetic resins and cellulose compounds, and being dissolved in the liquid component in sufficient quantity to give the ink the consistency of an ordinary oil-varnish printing ink, and to bind the pigment to paper when the ink is applied by an ordinary printing press, and substantially all of the liquid component having a vapor pressure at 20° C. which is as low as the vapor pressure of diethylene glycol monobutyl ether at 20° C., and the major part of the liquid component having a vapor pressure which at 150° C. approximates that of ethyl alcohol at ordinary temperatures and forming a stable solution with the solid component.

14. A printing ink comprising a coloring material in a vehicle consisting of a solid component, composed principally of a binder of the group consisting of natural and synthetic resins and cellulose esters, and a liquid component, composed principally of volatilizable solvent for the binder, said binder being present in amount approximately one-half to two-thirds of said liquid component, by weight, and said solvent having a vapor pressure at 20° C. as low as that of diethylene glycol monobutyl ether at room temperatures of 20° C., and having a vapor pressure at 150° C. equivalent to that of ethyl alcohol at room temperature.

15. A printing ink having a consistency suitable for ordinary printing and comprising a coloring material and a vehicle therefor including a liquid component and a solid component, said solid component being principally a binder for said coloring material, and said liquid component consisting essentially of a minor proportion of an agent adapted to prevent brittleness of the binder and a major proportion of a volatilizable solvent having vapor pressure at 20° C. as low as that of diethylene glycol monobutyl ether at room temperatures of 20° C., and a vapor pressure at elevated temperature of 150° C. equivalent to that of ethyl alcohol at ordinary room temperature.

ALBERT E. GESSLER.